United States Patent [19]
Edelen et al.

[11] Patent Number: 5,481,170
[45] Date of Patent: Jan. 2, 1996

[54] METHOD AND APPARATUS FOR CONTROLLING SHIFT FORCE IN AN AUTOMATED MECHANICAL TRANSMISSION

[75] Inventors: Stephen A. Edelen, Battle Creek, Mich.; Syed F. Hussain, Anaheim Hills, Calif.; Chiau-Chieh Ong, Novi, Mich.

[73] Assignee: Eaton Corporation, Cleveland, Ohio

[21] Appl. No.: 104,725

[22] Filed: Aug. 11, 1993

[51] Int. Cl.⁶ ............................................. G05F 1/10
[52] U.S. Cl. ..................... 318/650; 318/610; 318/632
[58] Field of Search ............................. 318/650, 610, 318/632, 560; 74/335, 843; 38/599

[56] References Cited

U.S. PATENT DOCUMENTS

| | | | |
|---|---|---|---|
| 3,619,755 | 11/1971 | Munro et al. | 318/599 |
| 3,896,356 | 7/1975 | Hoffman et al. | 318/560 |
| 4,070,609 | 1/1978 | Barrett et al. | 318/610 |
| 4,081,727 | 3/1978 | Green | 318/610 |
| 4,160,488 | 7/1979 | Blakeslee | 318/610 |
| 4,856,360 | 4/1989 | Yoshimura et al. | |
| 4,911,031 | 3/1990 | Yoshimura et al. | |
| 5,196,774 | 3/1993 | Baciak et al. | 318/560 |
| 5,219,391 | 6/1993 | Edelen | |
| 5,281,902 | 1/1994 | Edelen et al. | 318/610 |
| 5,305,240 | 4/1994 | Davis | |

Primary Examiner—William M. Shoop, Jr.
Assistant Examiner—Karen Masih
Attorney, Agent, or Firm—Brooks & Kushman

[57] ABSTRACT

The shift quality of an automated mechanical transmission is improved and transmission wear is reduced by controlling the armature current of the motor driving the transmission shifting mechanism. The current is monitored by a microcontroller to determine if the shifting mechanism has encountered a snag or has stalled during a shift operation. The microcontroller is programmed to control the duty cycle of a pulse width modulated (PWM) voltage signal, applied to the motor, in accordance with an algorithm which provides both proportional and derivative control of the error between the measured current and a target current. The rapid reduction in current spikes through PWM control reduces the force applied to the shifting mechanism and thus the sliding clutch and transmission gearing.

6 Claims, 6 Drawing Sheets

METHOD AND APPARATUS FOR CONTROLLING SHIFT FORCE IN AN AUTOMATED MECHANICAL TRANSMISSION

TECHNICAL FIELD

This invention relates to automated mechanical transmission systems wherein gear ratio change is accomplished by a DC motor driven shift mechanism and more particularly to a method of controlling the force applied by the motor in order to improve the shift quality and reduce wear of the transmission.

BACKGROUND ART

Automated mechanical transmission systems employing microprocessor based electronic control units which respond to various vehicle operating condition or to operator inputs to effect a gear ratio change or shift are well known in the art. See, for example, U.S. Pat. No. 5,053,962 assigned to the assignee of the present invention, the disclosure of which is hereby incorporated by reference. An electric motor driven shift mechanism may be used to perform the shift operation in response to either a manual or automatic shift initiation. See, for example, U.S. Pat. No. 4,873,881 assigned to the assignee of the present invention, the disclosure of which is hereby incorporated by reference. In U.S. Pat. No. 4,873,881, a shift finger is driven by one or more DC motors along an X—X axis to select a particular shift rail and along a Y—Y axis to effect movement of a sliding clutch into or out of engagement with a gear.

There are three possible movements involved in the shift of an automated mechanical transmission. The three movements are (a) pull to neutral, (b) rail change and (c) gear engagement. During pull to neutral the sliding clutch of the transmission disengages from one of the transmission gears and moves to a neutral or out of gear position. During gear engagement the sliding clutch is moved from the neutral position into gear engagement with the selected gear. It is important that both gear disengagement and gear engagement be as smooth as possible to maximize shift quality and minimize cab lurch or jerk. Cab lurch occurs when an unintended or unexpected gear engagement or disengagement occurs.

During a pull to neutral operation, the sliding clutch is preloaded by the shifting mechanism with a predetermined force. This preload force is less than the frictional force normally developed by driveline torque acting on the clutch and the clutch therefore remains engaged with the gear. However, oscillations in the driveline may cause the frictional sliding force developed at the sliding clutch by the driveline to drop below the preload force. This can result in an premature gear disengagement causing cab lurch. It is preferable that disengagement take place during the zero torque shift window which occurs normally during deceleration of the engine relative to the vehicle. Also, if disengagement is not accomplished during the zero torque window, the driveline torque will reverse direction causing the shift yoke and subsequently the electric motor to rapidly stall. Because the motor has substantial inertia, this stall condition may result in sufficient force on the shifting mechanism to cause the sliding clutch to "rattle" out of gear, producing both cab lurch and substantial impact damage to the mechanical linkage.

During engagement of the clutch with a gear, the force applied should be only slightly greater than the frictional force developed on the sliding clutch by the driveline. Even though the controller will not attempt to engage the sliding clutch with the gear until the speed of the two are nearly synchronous, out of synchronous engagement may occur which will cause cab lurch and damage to the sliding clutch unless through control of the force being applied to the sliding clutch, this out of synchronous engagement can be negated.

SUMMARY OF THE INVENTION

In view of the above it is an object of the present invention to improve shift quality and reduce wear in an automated mechanical transmission.

It is another object of the present invention to reduce the occurrence of inadvertent or unintended pull to neutral shift operations and avoid excessive impact and butting during gear engagement by precisely controlling the motor force applied to the shift mechanism.

It is another object of the present invention to improve shift quality and reduce wear of an automated mechanical transmission by quickly reducing armature current spikes resulting from a stalling of the motor of the X—Y shifting mechanism during a gear shift operation.

It is another object of the present invention to reduce peak stresses on the mechanical parts of an automated mechanical transmission by quickly reducing the force applied to the sliding clutch in the event of a rapid motor stall during engagement or disengagement with a gear.

It is another object of the present invention to improve shift quality and reduce wear in an automated mechanical transmission by controlling the force applied to the sliding clutch by a motor driven shifting mechanism by controlling the voltage applied to the motor as a function of the rate of change of the error of the motor armature current relative to a target current.

In accordance with the present invention the shift quality of an automated mechanical transmission is improved by precisely controlling the armature current of the motor driving the transmission shifting mechanism. The current drawn by the motor is monitored by the transmission microcontroller to determine if the shifting mechanism has encountered a snag or has stalled during a shift operation. The microcontroller is programmed to control the duty cycle of a pulse width modulated (PWM) voltage signal, applied to the motor, in accordance with an algorithm which provides both proportional and derivative control of the error between the current sensed by the microcontroller and a target current. The current is controlled by adjusting the duty cycle of a pulse width modulated motor voltage control signal in order to minimize large motor current variations as might otherwise occur during shift operations. The duty cycle of the PWM signal is varied as a function of the sum of the magnitude of the armature current error in relation to a target current and the rate of change of the error. By sampling the current at a high rate, one faster than the natural mechanical response, the current, which has a high response rate, can be used to reverse the motor torque before a reasonably compliant mechanical system can reach the maximum force associated with an uncontrolled dynamic impact. The rapid response to a motor stall and the rapid reduction in current through PWM control reduces the force applied by the shifting mechanism to the sliding clutch to thereby avoid the otherwise substantially greater forces that would be applied by the motor, and the potential damage to the transmission and motor can result from encountering a solid stop.

BRIEF DESCRIPTION OF THE DRAWINGS

A more complete understanding of the present invention may be had from the following detailed description which should be read in conjunction with the drawings in which.

DETAILED DESCRIPTION OF THE PREFERRED EMBODIMENT

Figure 1:
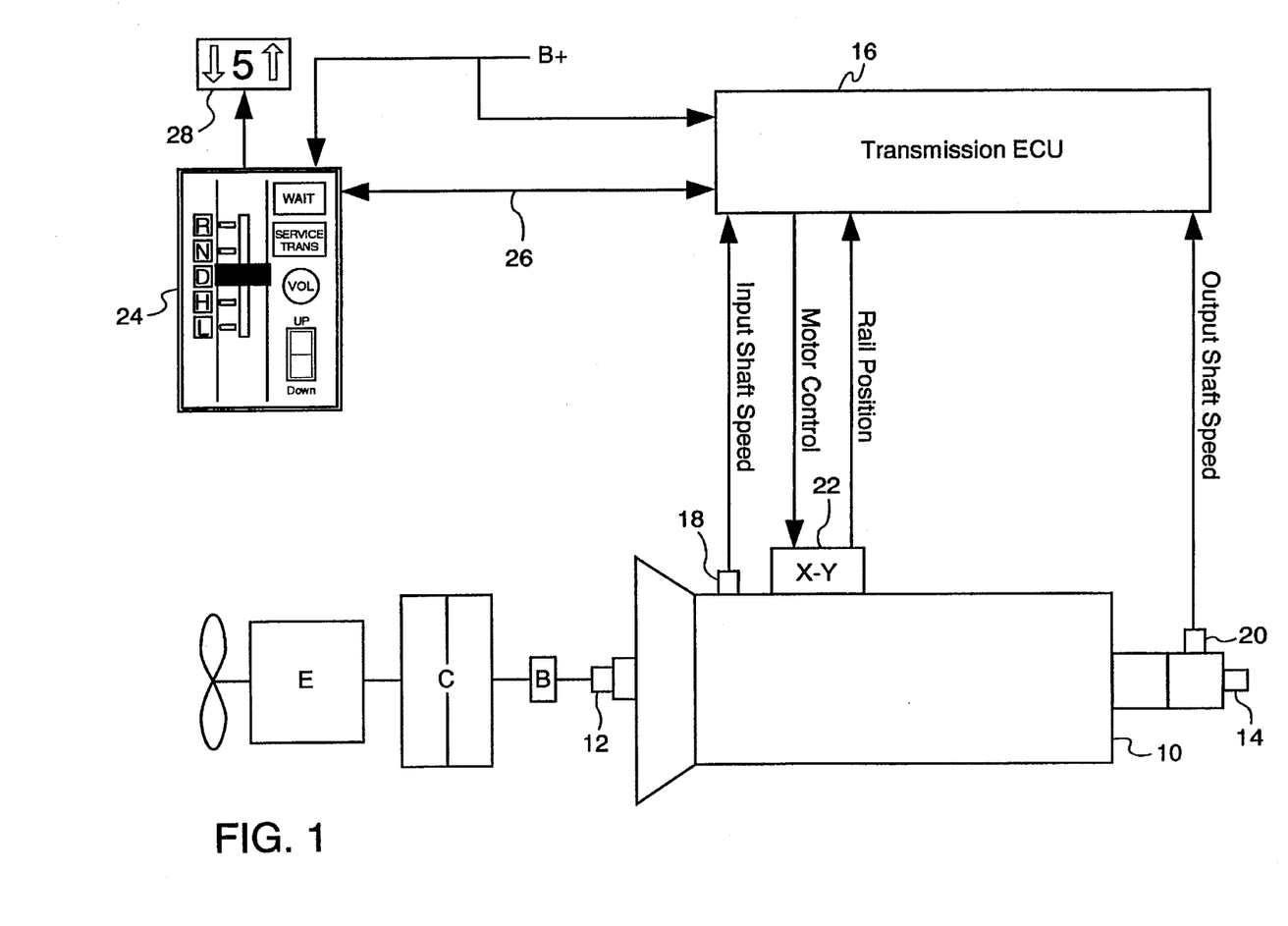
FIG. 1 is a block diagram of an automated mechanical transmission system of the type that would benefit from the force controlled shift method of the present invention.

Referring now to the drawings and initially to FIG. 1, an automated mechanical transmission 10 is shown. The transmission is of conventional design, such as the partially automated range type compound transmission with a multiple ratio main transmission section connected in series with a multiple ratio auxiliary section. Transmission 10 includes an input shaft 12 driven by a prime mover such as a diesel engine E through a normally engaged, but selectively disengagable, friction master clutch C. The master clutch C has an driving portion connected to the engine crankshaft and a driven portion fixed to the transmission input shaft 12. The engine is fuel controlled by a manually operable throttle device (not shown) and the master clutch is manually controlled by a clutch pedal or the like (not shown). The transmission output shaft 14 is driven through the gearing of the transmission 10 at a speed which is reduced in relation to the transmission input shaft 12 by the ratio of the current gear selected.

Shifting of the gears of the transmission 10 is under the control of a microcontroller (ECU) 16, preferably microprocessor based, which receives inputs from a number of sensors as indicated, including an input shaft sensor 18 and an outputshaft sensor 20. The ECU 16 receives inputs from and provides control signals to an X—Y shifting mechanism 22 to effect gear shifts. The shifting mechanism is described more fully in the aforementioned U.S. Pat. No. 4,873,881, assigned to the assignee of the present invention, and which is hereby incorporated herein by reference. The ECU 16 also receives inputs from and provides control signal to a shift console and display unit generally designated 24 over a data link 26. The unit 24 provides status information to the driver and also includes Up and Down buttons for manually shifting the transmission when the console is in the Hold position H. A driver display module 28 may be provided to display current gear and may include arrows showing whether the shift was an upshift or a downshift. Further details regarding the transmission 10 and the system for controlling such a transmission may be obtained from the aforementioned U.S. Pat. No. 5,109,721 as well as U.S. Pat. No. 5,050,079, and the patents referenced and discussed therein, the disclosures of which are hereby incorporated by reference.

Figure 2:
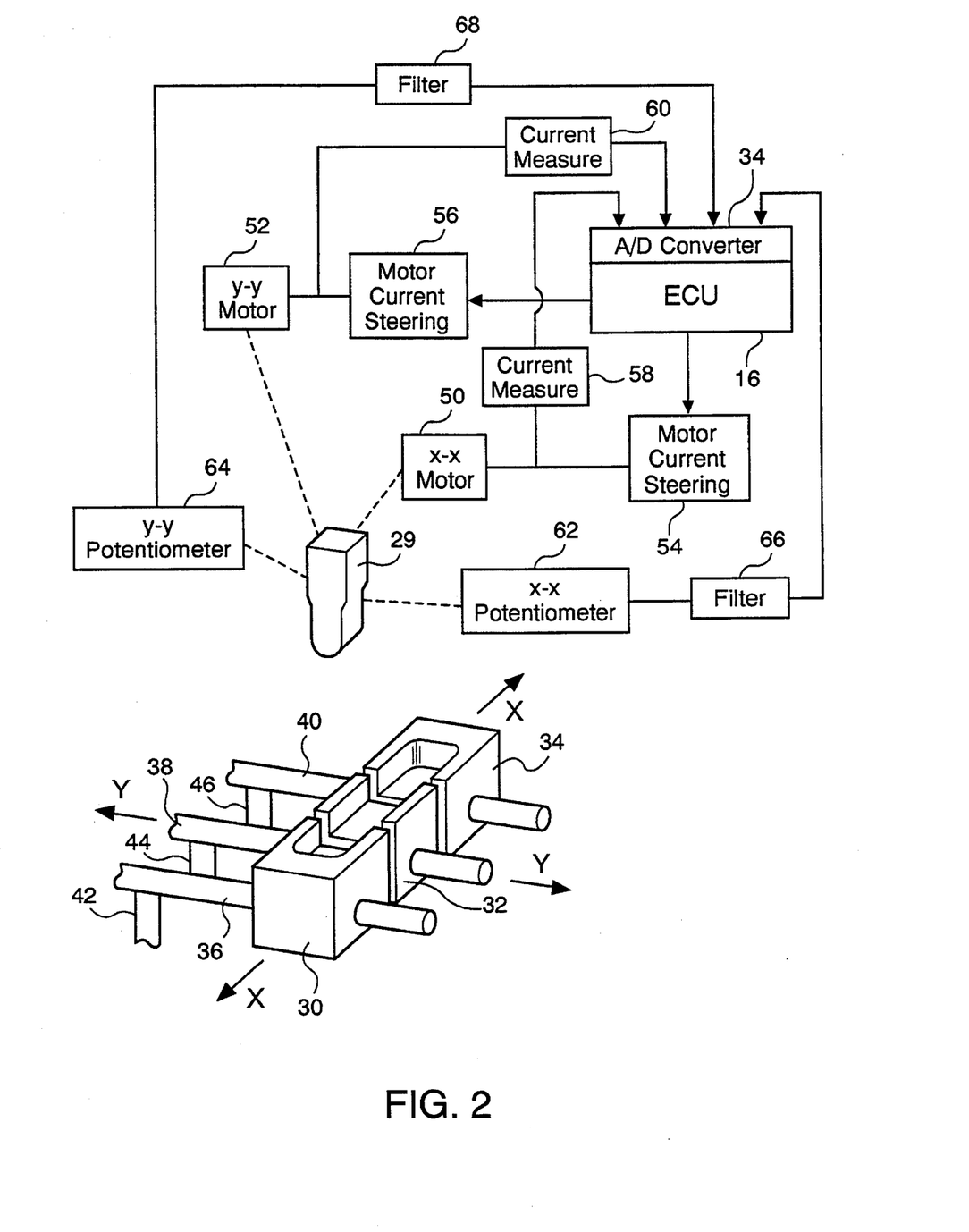
FIG. 2 is block diagram of the microcontroller based system for controlling the force applied to the shifting mechanism of an automated mechanical transmission.

Referring now to FIG. 2, the X—Y shifting mechanism 22, includes a shift finger 29 which is adapted to selectively contact the inner walls of shift blocks 30, 32, and 34. The shift blocks 30, 32, and 34 are respectively mounted on shift rails 36, 38 and 40 commonly used in mechanical gear change transmissions. Each of the shift rails carry a shift fork or yoke 42, 44, and 46, respectively, affixed thereto for axially movement therewith. As is well known, the shift forks are each associated with a positive sliding clutch mechanism for selectively engaging and disengaging gears to a shaft. The finger 29 is coupled through appropriate mechanisms (not shown) to permanent magnet motors 50 and 52 which are adapted to move the finger in the X—X and X—Y directions respectively, as explained in the aforementioned patent. Alternatively, a single motor and appropriate clutch and drive mechanisms may be used to selectively move the finger along the X—X and Y—Y axes as explained in the aforementioned patent.

The speed and direction of rotation of the motors 50 and 52 is controlled by a variable duty cycle pulse width modulated (PWM) signal applied to current steering logic 54 and 56 from the ECU 16. The motor armature current is measured as indicated at 58 and 60, respectively, and converted to a digital value by analog to digital converter 62 and input to the ECU 16. The ECU is programmed to control the current to the motors 50 and 52 by adjusting the duty cycle of the PWM signal as will be described more fully hereinafter. The position of the finger 29 along the X—X and Y—Y axes is sensed by potentiometers 62 and 64, respectively, filtered at 66 and 68, respectively, converted to digital values and input to the ECU 16. The potentiometers 62 and 64 preferably provide an output of from 0–5 volts over the range of shift finger movement. The output of the potentiometers is converted to binary words having a digital value of from 0–1023 bits.

Figure 3:
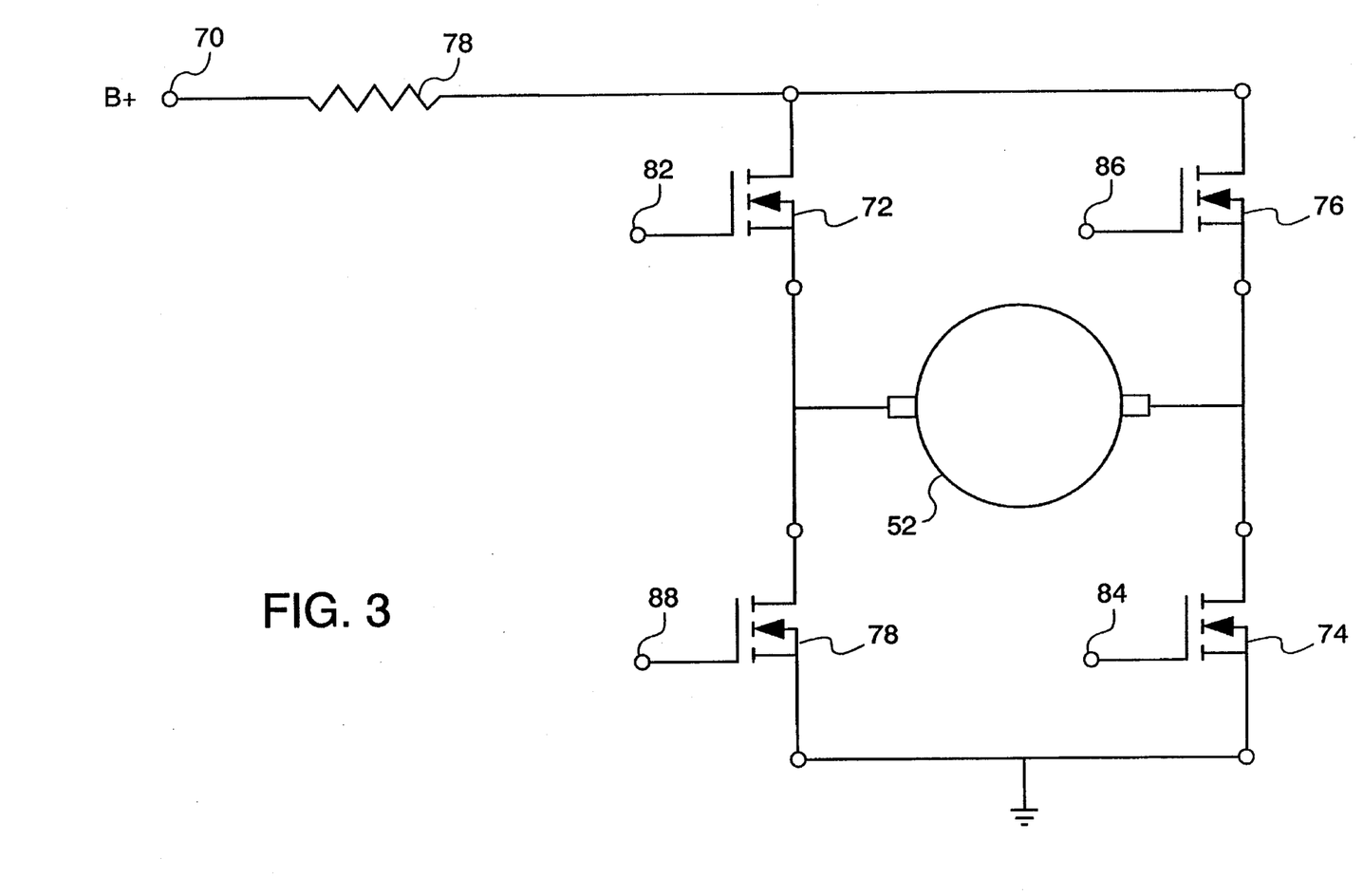
FIG. 3 is a schematic diagram of the current steering control circuit of FIG. 2.

The microcontroller 16 through the steering logic 54 and 56 controls the direction of motor rotation and through duty cycle variation of the PWM signal, controls the output torque and speed of the motors. Referring now to FIG. 3 the current steering logic block 56 is shown in more detail. The motor 52 is connected across a source of DC potential such as the vehicle battery identified as B+ connected between the terminal 70 and ground. The direction of current flow thought the motor 52 and thus the motor direction, is controlled by activation of appropriate ones of the solid state switches 72,74,76 and 78 by a control signal applied to their respective gate electrodes 82, 84,86 and 88. By turning on the switches 72 and 74 and turning off the switches 76 and 78, the motor is driven in a one direction, for example clockwise. When the switches 72 and 74 are turned off and the switches 76 and 78 are turned on the motor is driven in a counterclockwise direction.

Regardless of the direction of rotation, the torque of the motor 52 and thus the force applied to the finger 29, is directly proportional to the motor armature current. For a given motor speed, force can be controlled by adjusting the voltage applied across the motor. A special and crucial case during the shifting of a transmission is a motor speed of zero corresponding to a motor stall. If the motor stalls, because of the high reverse torque placed on the motor by driveline oscillations, the current drawn by the motor will increase and cause a greater force to be applied by the motor. This increase in force can result in poor shift quality and increased wear on the transmission. Therefore, it is desirable to reduce the voltage applied to the motor in order to reduce the current and thus the force. The voltage reduction or attenuation of the applied battery voltage is accomplished by reducing the time that the switches are turned on during a fixed time interval. Thus, the ECU by controlling the time that the appropriate pair of switches, 72,74 for example, are turned on, applies a variable duty cycle pulse width modulated voltage signal to the motor 52.

Figure 4:
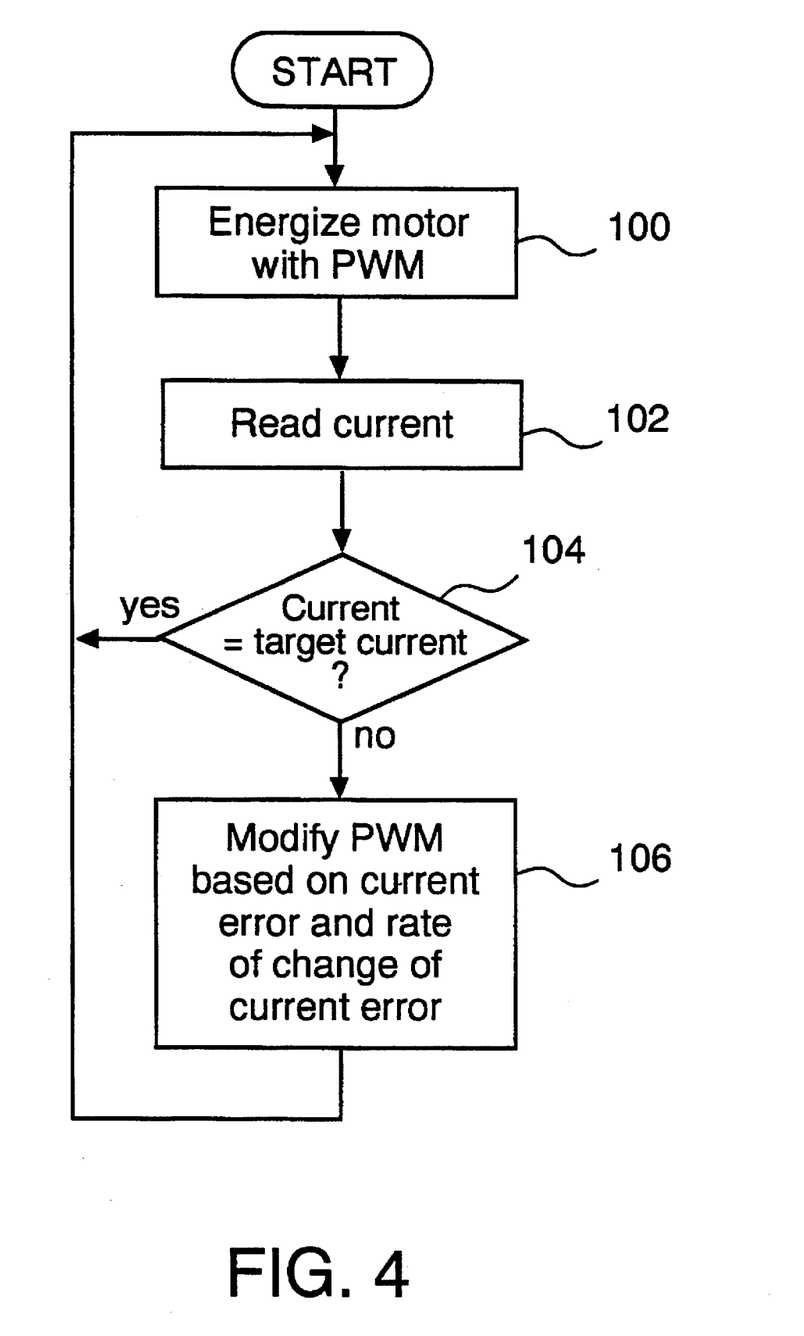
FIG. 4 is a flow chart depicting the force control gear shift method of the present invention.
Figure 5:
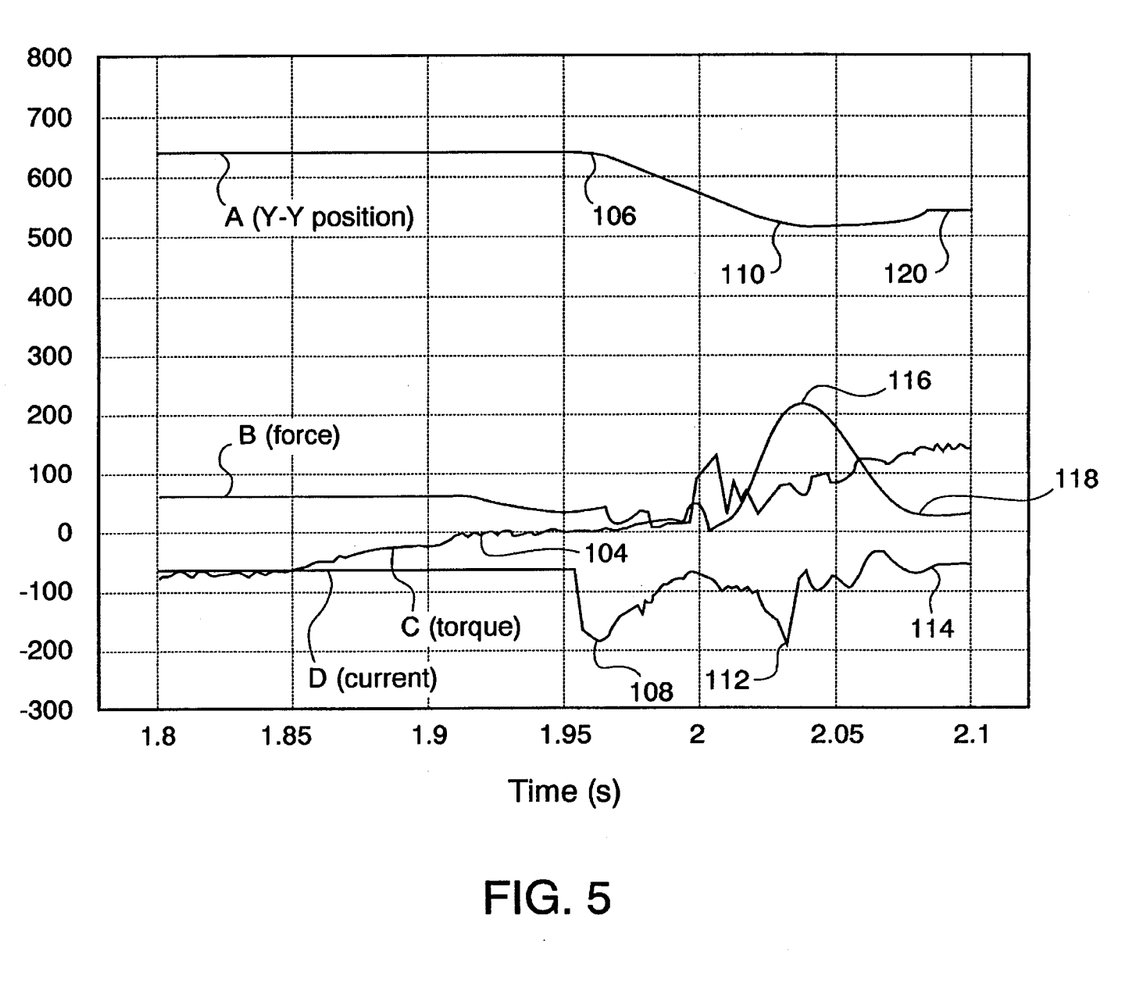
FIG. 5 is a chart of shift finger position, yoke force, driveline torque and motor current with respect to time during an attempted pull to neutral shift operation.

A resistor 78 is connected in series with the motor 52 for monitoring the armature current of the motor. Current flowing though the resistor 78 is detected by the ECU which periodically senses, through the A/D converter, the voltage developed across the resistor. As shown in the flowchart of FIG. 4, the ECU energizes the motor 52 with a PWM control signal at 100 and periodically measures the motor armature current at 102. The sensed current is compared with a desired or target current at 104 and if the desired and target currents are not equal a new duty cycle for the PWM signal is calculated at 106. The new duty cycle is equal to the old duty cycle plus the error between the current measured and the desired or target current times a proportional gain factor plus the difference between the present current error and the previous current error times a differential gain factor. This may be expressed by the following equation:

Duty Cyclene$_{new}$=Duty Cycle$_{old}$+current error * KP_CY+
(present current error—previous current error) * KD_CY where KP_CY is a proportional gain factor and KD_CY is a differential gain factor Referring now to FIG. 5, traces produced during a pull to neutral shift operation illustrate how the current control method of the present invention prevents the application of an uncontrolled force to the shifting mechanism during the occurrence of an expected driveline oscillation. Trace A represents the position of the shift finger 29 as provided by the potentiometer 64 in digital counts over time. Trace B represents the force applied to the yoke 44 in pounds over time. Trace C represents the vehicle driveline torque in lb-ft/10 over time. Trace D represents the motor armature current in amperes×10 over time. A preload force of approximately 50 pounds is applied to the yoke 44 by a motor current of 6 amps which represents the target current. At 104 the driveline torque drops to approximately zero and at 106 the motor begins to move in response to the drop in driveline torque. At approximately 1.96 seconds on the trace, the microcontroller implements a program routine for rapidly shifting the transmission to neutral. Initiation of the routine involves detection of one or more trigger events indicative of motor rotation, as explained in copending application U.S. Ser. No. 985,190 filed Nov. 30, 1992, assigned to the assignee of the present invention, the disclosure of which is hereby incorporated by reference. This routine applies full voltage to the motor. The motor current accordingly rises and peaks briefly as indicated at 108 and then drops back toward 6 amps as the motor moves toward neutral and the force on the yoke 44 drops to zero. However, after the zero torque window, existing from about 1.92 seconds to about 1.99 seconds, the driveline torque reverses direction. At this point in time the wheels are actually driving the engine instead of the engine driving the wheels. As a result, the motor slows and eventually stalls at 110. Instead of the current increasing and causing a force of perhaps 300 pounds of pressure, the armature current peaks at 112 and is quickly returned to 6 amps at 116 by the current control method of FIG. 3. Accordingly, the yoke force peaks at 116 and is quickly returned to 50 foot pounds at 118. The reduction in the yoke force, as the current drops, allows the motor to move back from the stalled position, thereby avoiding the wear and tear on the motor and transmission that will occur should a gear disengagement operation continues during the non-zero driveline torque condition.

Figure 6:
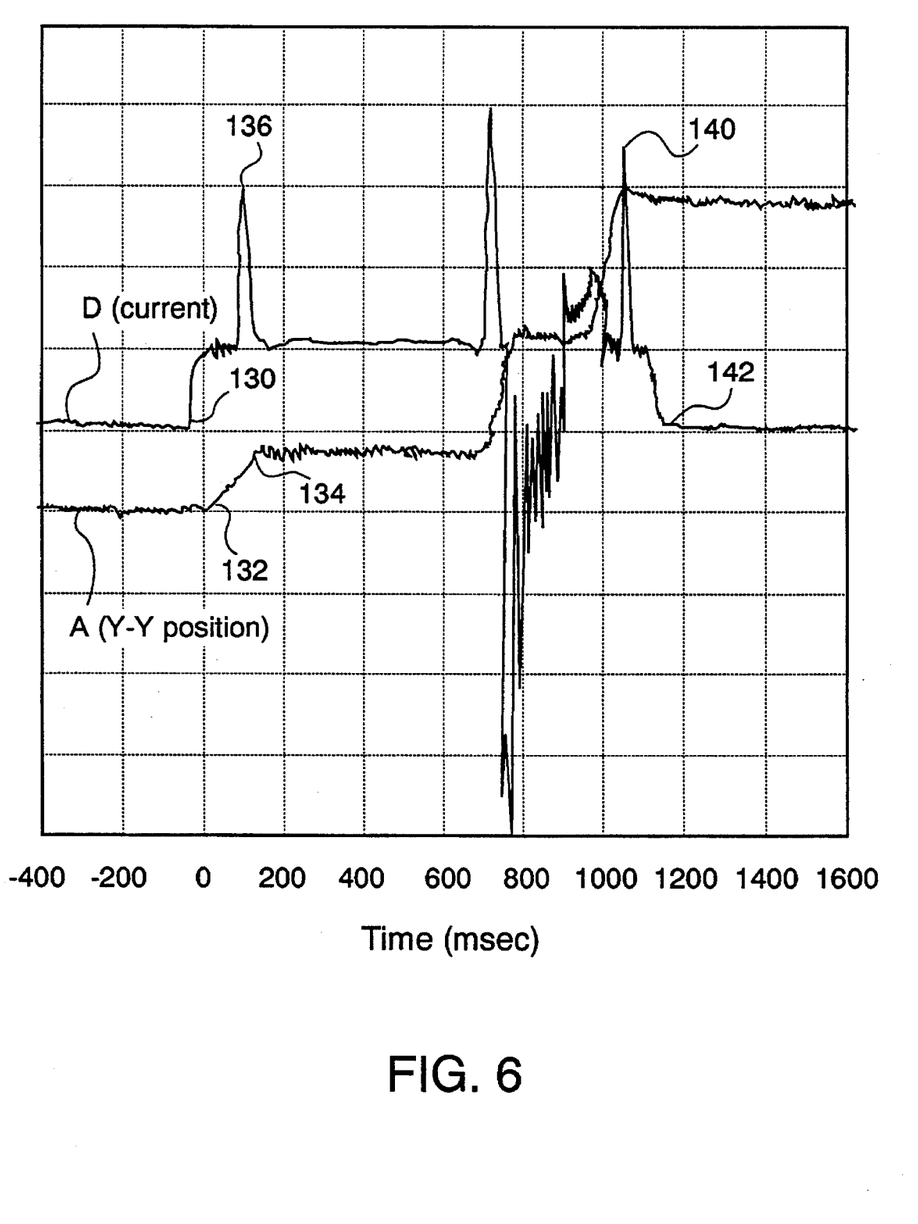
FIG. 6 is a chart of motor current, and shift finger position during a pull to neutral shift operation and a subsequent gear engagement.

Referring now to FIG. 6, a shift operation is depicted in which disengagement from one gear and engagement with another gear occurs. Only the shift finger position plot A (100 bit per division), and the motor armature current plot D (5 amperes per division), are shown. Prior to the pull to neutral shift operation a PWM voltage is applied to the motor at 130 and is controlled to maintain a preload motor armature current of 6 amp. This preload current is applied during the approximately 100 msecs existing between the time the shift finger 29 begins to move at 132 and when the shift finger hits a solid stop at 134 after taking up the mechanical backlash and play in the transmission. When the finger stops, the motor current peaks very briefly at 136 and is brought down to and stabilized at 6 amps by the current control method of FIG. 3. The current variation occurring between about 700 msecs and 900 msecs, result from the ECU implementation of the program routine for pulling the transmission to a neutral position as mentioned in connection with FIG. 4. Upon verification that the transmission is in neutral position and the desired gear has been selected, the transmission is ready for a gear engagement operation as soon as the two shafts being coupled are turning at substantially the same speed. When substantially synchronous speed is attained at about 900 msecs, a target motor armature current of 10 amp is established for control purposes and the motor begins to move the clutch into engagement with the gear selected. At 138 the motor stalls due to gear engagement and the current peaks briefly at 140 but is quickly brought to zero at 142 by the current control method of FIG. 3.

While the best mode for carrying out the invention has been described in detail, those familiar with the art to which this invention relates will recognize various alternative designs and embodiments for practicing the invention as defined by the following claims.

What is claimed is:

1. A method of controlling the force applied to the shifting mechanism of an automated mechanical transmission during shifting movements, the transmission including at least one shift rail, the shifting mechanism including a shift member driven by a motor, the shift member cooperating with the shift rail to effect shifting of the transmission, said method comprising the steps of:

energizing the motor with a variable duty cycle pulse width modulated control signal to cause a target current to be applied to said motor;

sensing the current drawn by the motor; and adjusting the duty cycle of said control signal as a function of the sum of the error between the current sensed and said target current plus the rate of change of said error, to reduce said error toward zero.

2. The method of claim 1 wherein said target current produces a predetermined preload force on said shift member.

3. The method of claim 2 wherein said target current is increased in response to detection of motor movement to initiate a pull to neutral shift operation.

4. Apparatus for controlling the force applied to the shifting mechanism of an automated mechanical transmission during shifting movements, said transmission including at least one shift rail, said shifting mechanism including a shift member driven by a motor, said shift member cooperating with the shift rail to effect shifting of the transmission, current steering means connected with said motor and responsive to control signals for controlling the direction of rotation of said motor, controller means applying a variable duty cycle pulse width modulated control signal to said steering means to cause a target current to be applied to said motor, said controller means sensing the current drawn by the motor and adjusting the duty cycle of said control signal as a function of the sum of the error between the current sensed and said target current plus the rate of change of said error, to reduce said error toward zero.

5. The apparatus of claim 4 wherein said target current produces a predetermined preload force on said shift member.

6. The apparatus of claim 5 wherein said controller means increases said target current in response to detection of motor movement to initiate a pull to neutral shift operation.

* * * * *